United States Patent
Yabe et al.

(10) Patent No.: US 10,615,652 B2
(45) Date of Patent: Apr. 7, 2020

(54) ROTOR, ELECTRIC MOTOR, COMPRESSOR, AIR BLOWER, AND AIR CONDITIONER

(71) Applicant: Mitsubishi Electric Corporation, Tokyo (JP)

(72) Inventors: Koji Yabe, Tokyo (JP); Yoshikazu Fujisue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/082,600

(22) PCT Filed: May 31, 2016

(86) PCT No.: PCT/JP2016/065959
§ 371 (c)(1),
(2) Date: Sep. 6, 2018

(87) PCT Pub. No.: WO2017/208317
PCT Pub. Date: Dec. 7, 2017

(65) Prior Publication Data
US 2019/0081523 A1 Mar. 14, 2019

(51) Int. Cl.
*H02K 1/02* (2006.01)
*H02K 21/14* (2006.01)
*H02K 1/27* (2006.01)

(52) U.S. Cl.
CPC .............. *H02K 1/276* (2013.01); *H02K 1/02* (2013.01); *H02K 21/14* (2013.01); *H02K 2213/03* (2013.01)

(58) Field of Classification Search
CPC .......... H02K 1/276; H02K 21/14; H02K 1/02; H02K 2/2766; H02K 2/2773;
(Continued)

(56) References Cited

U.S. PATENT DOCUMENTS

| 4,139,790 A | 2/1979 | Steen |
| 2006/0113858 A1 | 6/2006 | Hino et al. |

(Continued)

FOREIGN PATENT DOCUMENTS

| CN | 204761185 U | 11/2015 |
| JP | 2006-187189 A | 7/2006 |

(Continued)

OTHER PUBLICATIONS

International Search Report of the International Searching Authority dated Aug. 23, 2016 for the corresponding international application No. PCT/JP2016/065959 (and English translation).

(Continued)

*Primary Examiner* — Jermele M Hollington
*Assistant Examiner* — Alexander A Singh
(74) *Attorney, Agent, or Firm* — Posz Law Group, PLC (57) ABSTRACT

A rotor includes an electromagnetic steel sheet and a permanent magnet. The electromagnetic steel sheet includes a magnet insertion hole, a slit, a first end part, a second end part, a third end part, a fourth end part, and a fifth end part. Expressions of L1>L2 and L3≥L2 are satisfied, where L1 is a distance from the first end part to the magnet insertion hole, L2 is a distance from a first boundary between the first end part and the second end part to the magnet insertion hole, and L3 is a distance from a second boundary between the second end part and the third end part to the magnet insertion hole.

15 Claims, 9 Drawing Sheets

(58) Field of Classification Search
CPC ...... H02K 1/2713; H02K 1/272; H02K 1/274; H02K 1/2753; H02K 1/2773; H02K 1/2766; H02K 21/16; H02K 2213/03
USPC ............ 310/156.83, 156.57, 156.84, 156.01, 310/156.56
See application file for complete search history.

(56) References Cited

U.S. PATENT DOCUMENTS

| | | |
|---|---|---|
| 2017/0070109 A1 | 3/2017 | Nigo et al. |
| 2017/0098970 A1* | 4/2017 | Tsuchida ................ H02K 21/16 |

FOREIGN PATENT DOCUMENTS

| | | |
|---|---|---|
| JP | 2007-306685 A | 11/2007 |
| JP | 2008-187778 A | 8/2008 |
| JP | 4198545 B2 | 10/2008 |
| JP | 2011-199946 A | 10/2011 |
| JP | 2012-050331 A | 3/2012 |
| JP | 2015-092817 A | 5/2015 |
| WO | 2013/114542 A1 | 8/2013 |
| WO | 2015/162690 A1 | 10/2015 |
| WO | WO-2015166532 A1 * | 11/2015 |

OTHER PUBLICATIONS

Office action dated Aug. 20, 2019 issued in corresponding KR patent application No. 10-2018-7031052 (and English translation thereof).
Office Action dated Jun. 11, 2019 issued in corresponding Japanese patent application No. 2018-520225 (and machine English translation).
Japanese Office action dated Jan. 7, 2020 issued in corresponding JP patent application No. 2018-520225 (and English translation thereof).
Office Action dated Feb. 3, 2020 issued in corresponding CN patent application No. 201680085692.1 (and English translation).

* cited by examiner

ROTOR, ELECTRIC MOTOR, COMPRESSOR, AIR BLOWER, AND AIR CONDITIONER

CROSS REFERENCE TO RELATED APPLICATION

This application is a U.S. national stage application of International Patent Application No. PCT/JP2016/065959 filed on May 31, 2016, the disclosure of which is incorporated herein by reference.

TECHNICAL FIELD

The present invention relates to a rotor including a permanent magnet.

BACKGROUND ART

To reduce noise of an electric motor, a rotor obtained by stacking a plurality of electromagnetic steel sheets with a slit is used. In the electric motor, as the amount of magnetic flux generated from a stator (magnetic flux toward the rotor) increases, the amount of magnetic flux from permanent magnets disposed in the rotor decreases. This phenomenon is generally called demagnetization (hereinafter referred to as "degradation of a demagnetization characteristic"). When the amount of magnetic flux from the permanent magnets decreases because of demagnetization, efficiency of the electric motor decreases. In view of this, to suppress demagnetization together with noise reduction, a rotor in which a tilt of a slit in the electromagnetic steel sheet is adjusted has been proposed (see, for example, Patent Reference 1).

PATENT REFERENCE

Patent Reference 1: WO 2013/114542

However, there is a problem that demagnetization is not ameliorated depending on a location or a shape of the electromagnetic steel sheet, thereby decreasing efficiency of the electric motor.

SUMMARY

It is therefore an object of the present invention to ameliorate demagnetization of a permanent magnet provided in a rotor.

A rotor according to the present invention includes: an electromagnetic steel sheet including a magnet insertion hole and a slit formed outside the magnet insertion hole in a radial direction; and a first permanent magnet inserted in the magnet insertion hole, wherein the electromagnetic steel sheet includes a first end part extending in a circumferential direction, a second end part adjacent to the first end part, a third end part adjacent to the second end part, a fourth end part adjacent to the third end part, and a fifth end part adjacent to the fourth end part, the first, second, third, fourth, and fifth end parts defining the slit, and the rotor satisfies expressions of $L1>L2$, $L1>L3$, and $L3 \geq L2$, where $L1$ is a distance from the first end part to the magnet insertion hole, $L2$ is a distance from a first boundary between the first end part and the second end part to the magnet insertion hole, and $L3$ is a distance from a second boundary between the second end part and the third end part to the magnet insertion hole.

According to the present invention, demagnetization of a permanent magnet provided in a rotor can be ameliorated.

DETAILED DESCRIPTION

First Embodiment

An electric motor 1 according to a first embodiment of the present invention will now be described.

In an xyz orthogonal coordinate system in each drawing, a z-axis direction (z axis) refers to a direction parallel to an axis line A1 (axial center) of a shaft 26 of the electric motor 1 (hereinafter referred to as an "axial direction"), an x-axis direction (x axis) refers to a direction orthogonal to the z-axis direction (z axis), and a y-axis direction refers to a direction orthogonal to both the z-axis direction and the x-axis direction.

Figure 1:
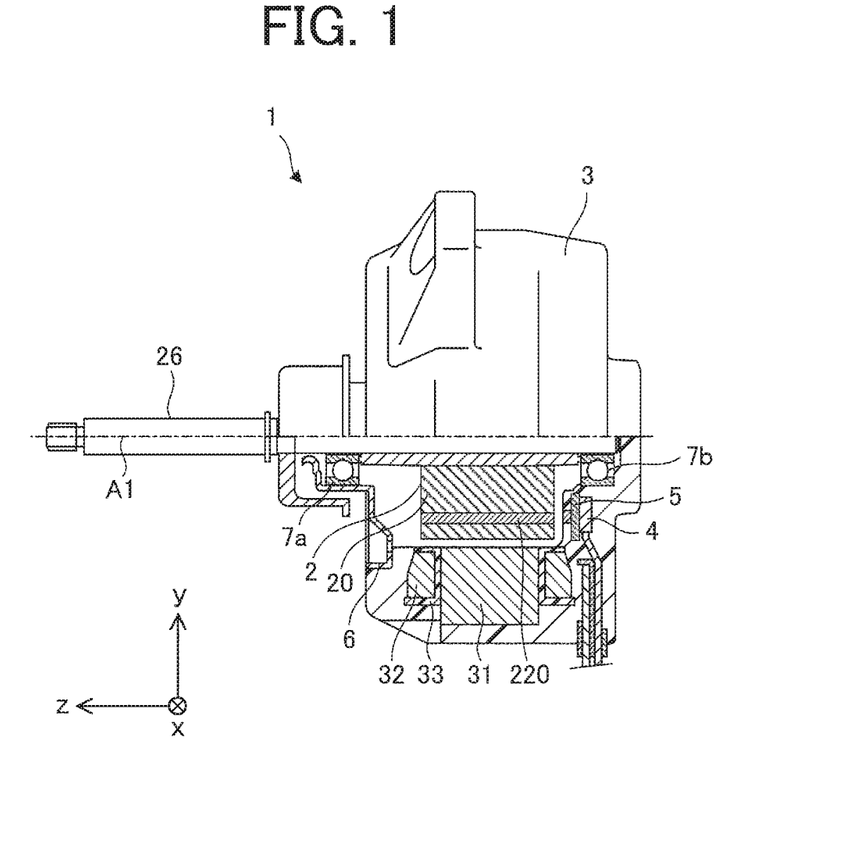
FIG. 1 is a partial cross-sectional view schematically illustrating a structure of an electric motor according to a first embodiment of the present invention.

FIG. 1 is a partial cross-sectional view schematically illustrating a structure of the electric motor 1 according to the first embodiment of the present invention.

Figure 2:
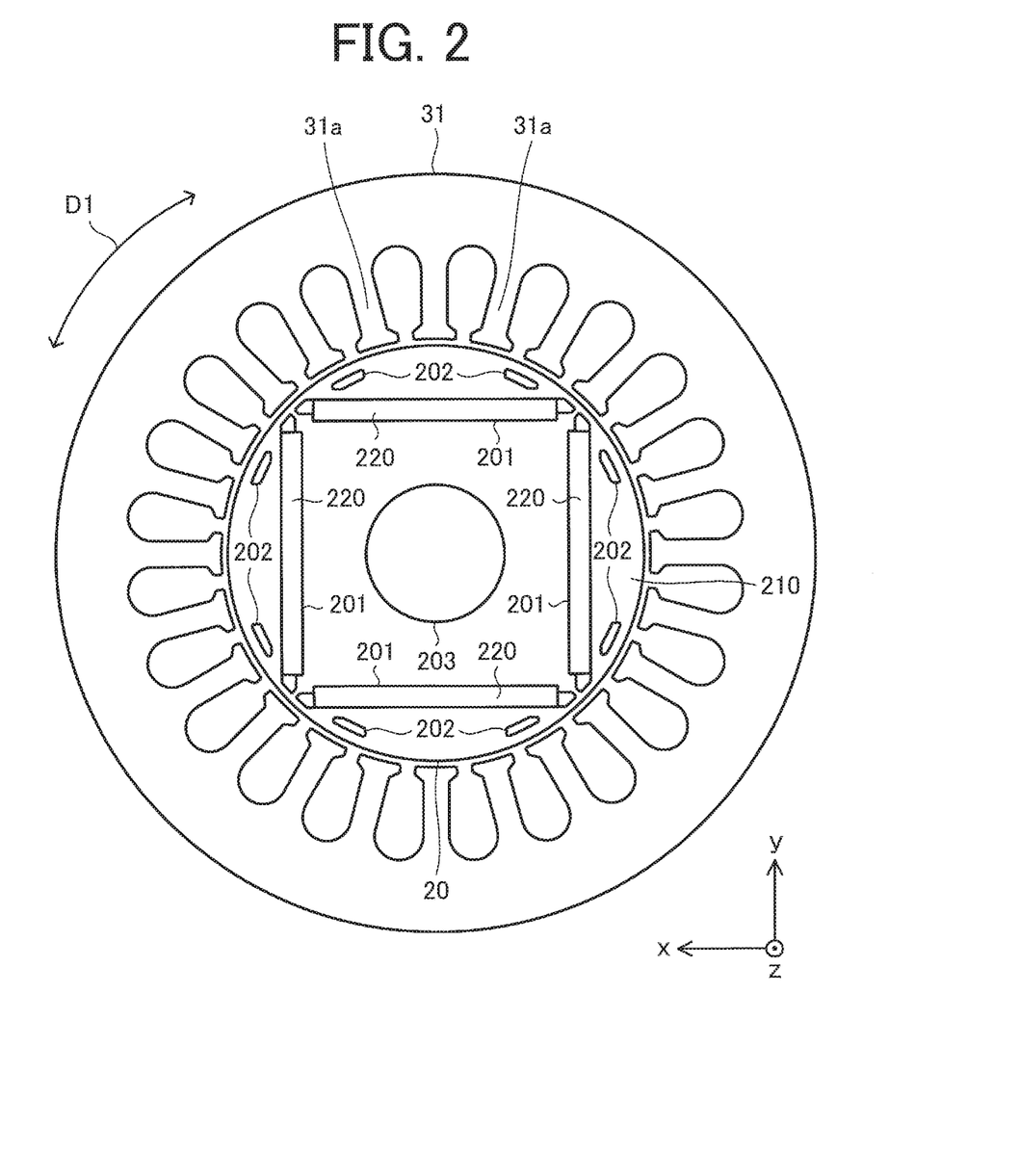
FIG. 2 is a plan view schematically illustrating a structure of a rotor core where permanent magnets are disposed and a stator core.

FIG. 2 is a plan view schematically illustrating a structure of the rotor core 20 where permanent magnets 220 are disposed and a stator core 31. An arrow D1 represents a direction along outer circumferences of a rotor core 20, the rotor 2, and the stator core 31 (hereinafter referred to as "circumferential direction").

The electric motor 1 includes the rotor 2, a stator 3, a circuit board 4, a magnetic sensor 5 for detecting a rotation position of the rotor 2, a bracket 6, and bearings 7a and 7b. The electric motor 1 is, for example, an interior permanent magnet electric motor. Electronic components such as a control circuit and the magnetic sensor 5 are mounted on the circuit board 4.

The rotor 2 includes the rotor core 20, at least one permanent magnet 220, and the shaft 26. A rotational shaft of the rotor 2 coincides with the axis line A1.

The stator 3 includes the stator core 31, a coil 32, and an insulator 33. The stator core 31 is formed by, for example, stacking a plurality of electromagnetic steel sheets. The stator core 31 is formed circularly. The coil 32 is formed by, for example, winding a lead wire around a tooth part 31a of the stator core 31 with the insulator 33 in between. The coil 32 is insulated by the insulator 33. In this embodiment, the stator core 31, the coil 32, and the insulator 33 are covered with a thermoplastic resin (molding resin) such as unsaturated polyester.

The rotor 2 is inserted inside the stator 3 with a gap in between. The bracket 6 is press-fitted in an opening on a load side (load side of the electric motor 1) of the stator 3. The shaft 26 is inserted in the bearing 7a, and the bearing 7a is fixed on the load side of the stator 3. Similarly, the shaft 26 is inserted in the bearing 7b, and the bearing 7b is fixed on a counter-load side of the stator 3.

A structure of the rotor core 20 will now be described.

Figure 3A:
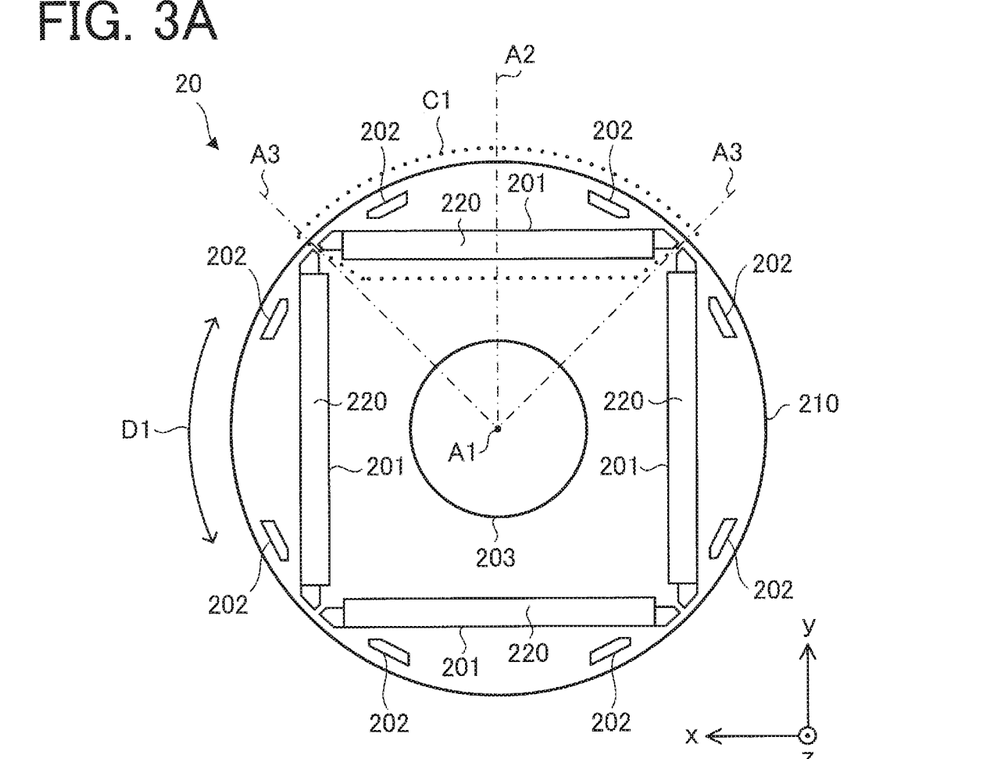
FIG. 3A is a plan view schematically illustrating a structure of the rotor core.
Figure 3B:
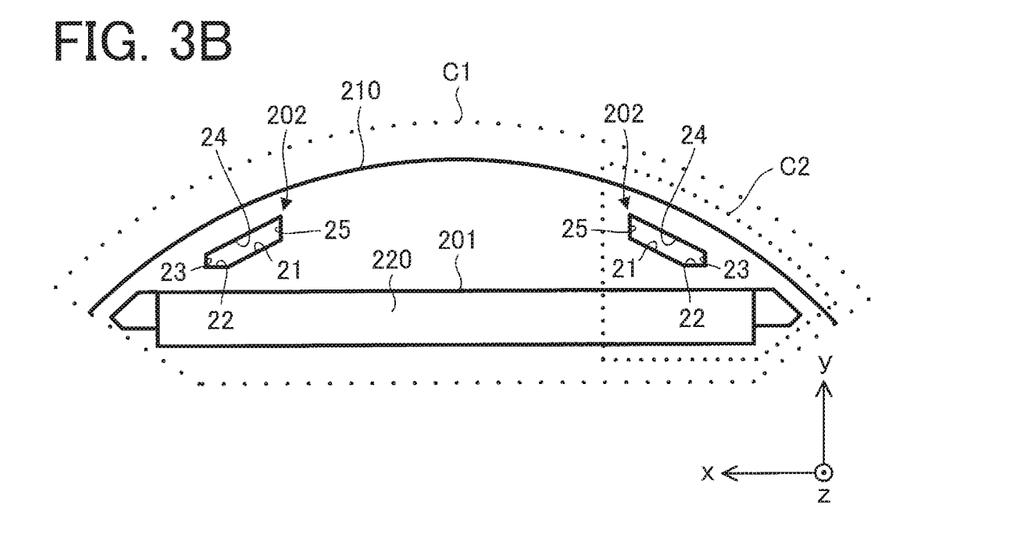
FIG. 3B is an enlarged view illustrating a region C1 indicated by a dotted line in FIG. 3A.

FIG. 3A is a plan view schematically illustrating a structure of the rotor core 20. FIG. 3B is an enlarged view illustrating a region C1 indicated by a dotted line in FIG. 3A. The permanent magnets 220 are disposed in the rotor core 20 (specifically, a magnet insertion hole 201) illustrated in FIGS. 3A and 3B.

As illustrated in FIG. 3A, a magnetic pole center line A2 indicating a magnetic pole center passes through the center of the permanent magnet 220 (magnet insertion hole 201) in a longitudinal direction (x-axis direction in FIG. 3A) and the axis line A1. A line A3 indicating an inter-pole part passes between adjacent permanent magnets 220 (magnet insertion holes 201) and through the axis line A1.

The rotor core 20 is formed by stacking a plurality of thin electromagnetic steel sheets 210. Each of the electromagnetic steel sheets 210 has a thickness t0 of 0.1 mm to 1 mm, for example. In this embodiment, the electromagnetic steel sheets 210 are formed in a predetermined shape. That is, in this embodiment, the plurality of electromagnetic steel sheets 210 have the same structure. However, the plurality of electromagnetic steel sheets 210 may include an electromagnetic steel sheet having a different structure.

Each of the electromagnetic steel sheets 210 includes at least one magnet insertion hole 201, at least one slit 202 that is a through hole (gap), and a shaft hole 203 in which the shaft 26 is inserted. The electromagnetic steel sheet 210 also includes a first end part 21, a second end part 22, a third end part 23, a fourth end part 24, and a fifth end part 25, and the first through fifth end parts 21 through 25 define the slit 202.

The electromagnetic steel sheet 210 is formed in an arbitrary structure by punching (press working) using a die. When an inner corner of the slit 202 is punched into an acute angle, an acute portion of the die are easily damaged. In the slit 202, it is preferable that corners forming acute angles be fewer. Thus, the inner corners of the slit 202 may be rounded. In this case, the radius of the roundness at each corner in the slit 202 is 0.3 mm or less, for example.

In this embodiment, a plurality of magnet insertion holes 201 (e.g., four magnet insertion holes 201) are formed in one electromagnetic steel sheet 210. The magnet insertion holes 201 penetrate in the axial direction.

The permanent magnets 220 are inserted in the magnet insertion holes 201. In this embodiment, the permanent magnet 220 inserted in one magnet insertion hole 201 forms one magnetic pole of the rotor 2. A plurality of permanent magnets 220 may be disposed in one magnet insertion hole 201.

The permanent magnets 220 are rare earth magnets containing, as a main component, at least one of neodymium, boron, and dysprosium (also referred to as neodymium rare earth magnets). In this embodiment, the permanent magnets 220 contain iron, neodymium, boron, and dysprosium. The type of the permanent magnets 220 is not limited to the example described in this embodiment, and the permanent magnets 220 may be made of other materials.

To reduce the cost of the permanent magnets 220, the permanent magnets 220 preferably have a dysprosium content of 4% by weight or less. With a small dysprosium content, a coercive force of the permanent magnets 220 decreases, and demagnetization easily occurs. Thus, permeance can be increased by increasing the thickness of the permanent magnets 220 in a radial direction of the rotor 2 (rotor core 20) (hereinafter also referred to as the "radial direction"), and demagnetization of the permanent magnets 220 can be compensated for. An excessive increase in the thickness of the permanent magnets 220, however, causes cost increase. In view of this, in this embodiment, the dysprosium content in the permanent magnets 220 is 4% by weight or less, and the electromagnetic steel sheet 210 includes the slit 202. Thus, the cost of the permanent magnets 220 can be reduced, and a demagnetization characteristic can be ameliorated.

Both ends (both ends in the direction orthogonal to the magnetic pole center line A2) of the permanent magnet 220 inserted in one magnet insertion hole 201 are preferably located outward (on the inter-pole part side) by ±30° in electrical angle (±15° in mechanical angle) with respect to the magnetic pole center line A2. Since the slit 202 extending in the circumferential direction is formed outside the ends of the permanent magnets 220 in the radial direction, harmonics of an induced voltage and torque ripple can be reduced.

In addition, in this embodiment, in the electromagnetic steel sheet 210, the plurality of slits 202 (e.g., eight slits 202) extending in the circumferential direction are formed outside the magnet insertion holes 201 (the permanent magnets 220) in the radial direction. In other words, the slits 202 are formed to tilt relative to the permanent magnets 220. Each of the slits 202 passes in the axial direction. In the example illustrated in FIG. 3A, two slits 202 are formed for one magnet insertion hole 201 (i.e., one magnetic pole) in the electromagnetic steel sheet 210.

The first end part 21 is adjacent to the second end part 22 and the fifth end part 25. In other words, the first end part 21 is formed between the second end part 22 and the fifth end part 25. The first end part 21 faces the fourth end part 24. The first end part 21 is formed at a position that is apart from the fourth end part 24 inward in the radial direction. The first end part 21 extends in the circumferential direction, and tilts relative to the longitudinal direction of the permanent magnet 220 (the direction orthogonal to the magnetic pole center line A2 on the xy plane). In this embodiment, the first end part 21 is a surface (inner surface) constituting an inner wall of the slit 202.

The first end part 21, together with the fourth end part 24, defines a gap in the radial direction. Accordingly, a magnetic flux from the permanent magnet 220 do not easily pass through the gap (i.e., the slit 202), and a flow of the magnetic flux changes. The first end part 21 contributes to reduction of harmonics of the induced voltage, reduction of cogging torque, and reduction of noise of the electric motor 1 during rotation of the rotor 2.

The second end part 22 is adjacent to an end of the first end part 21 and an end of the third end part 23. In other words, the second end part 22 is formed between the first end part 21 and the third end part 23. The second end part 22 is formed at a position that is apart from the fourth end part 24 inward in the radial direction. In the example illustrated in FIGS. 3A and 3B, the second end part 22 extends in parallel with the longitudinal direction of the permanent magnet 220. The second end part 22 may extend to tilt relative to the longitudinal direction of the permanent magnet 220. In this embodiment, the second end part 22 is a surface constituting an inner wall of the slit 202.

The second end part 22, together with the fourth end part 24, defines a gap in the direction (y-axis direction in FIG. 3B) orthogonal to the longitudinal direction of the permanent magnet 220. Accordingly, the magnetic flux from the permanent magnet 220 do not easily pass through the gap (i.e., the slit 202), and a flow of the magnetic flux changes. The second end part 22 contributes to reduction of harmonics of an induced voltage, reduction of cogging torque, and reduction of noise of the electric motor 1 during rotation of the rotor 2.

The third end part 23 is adjacent to the second end part 22 and the fourth end part 24. In other words, the third end part 23 is formed between the second end part 22 and the fourth end part 24. In the example illustrated in FIGS. 3A and 3B, the third end part 23 extends in the direction (direction parallel to the magnetic pole center line A2) orthogonal to the longitudinal direction of the permanent magnet 220. The third end part 23 may extend to tilt relative to the magnetic pole center line A2. In this embodiment, the third end part 23 is a surface (inner surface) constituting an inner wall of the slit 202.

If the third end part 23 is not formed in the electromagnetic steel sheet 210, the second end part 22 and the fourth end part 24 form an inner corner of the slit 202, and this corner is formed at an acute angle. If the inner corner of the slit 202 is at an acute angle, the width of the slit 202 is small, and thus it is difficult to restrict the direction of the magnetic flux from the permanent magnet 220. In addition, if the inner corner of the slit 202 is at an acute angle, a die for punching of the electromagnetic steel sheet 210 is easily damaged. Thus, the inner corner of the slit 202 is preferably formed not to be at an acute angle. In other words, it is preferable that corners forming acute angles be fewer in the slit 202.

Since the third end part 23 is formed between the second end part 22 and the fourth end part 24, it is possible to form the corner (inner corner of the slit 202) forming an obtuse angle (larger than 90°) between the second end part 22 and the third end part 23. In other words, the slit 202 can be formed so that the angle formed by the second end part 22 and the third end part 23 inside the slit 202 is larger than 90°. In this embodiment, the angle formed by the second end part 22 and the third end part 23 inside the slit 202 is 90°.

Similarly, a corner formed between the third end part 23 and the fourth end part 24 (inner corner of the slit 202) can be formed at an obtuse angle (larger than 90°). In this embodiment, the angle formed by the third end part 23 and the fourth end part 24 inside the slit 202 is larger than 90°.

That is, the third end part 23 can make a corner formed between the second end part 22 and the fourth end part 24 (corner at the inter-pole part side in the slit 202) at an obtuse angle (larger than 90°).

As described above, the third end part 23 can improve quality of the die, and can ease restriction of the direction of the magnetic flux from the permanent magnet 220. In addition, the third end part 23 contributes to reduction of harmonics of an induced voltage, reduction of cogging torque, and reduction of noise of the electric motor 1 during rotation of the rotor 2.

The fourth end part 24 is adjacent to the third end part 23 and the fifth end part 25. In other words, the fourth end part 24 is formed between the third end part 23 and the fifth end part 25. The fourth end part 24 extends in the circumferential direction, and tilts relative to the longitudinal direction of the permanent magnet 220. The fourth end part 24 faces the first end part 21. The fourth end part 24 is formed at a position that is apart from the first end part 21 outward in the radial direction. In this embodiment, the fourth end part 24 is a surface (inner surface) constituting an inner wall of the slit 202.

The fourth end part 24, together with the first end part 21, defines a gap in the radial direction. Accordingly, magnetic flux from the permanent magnet 220 do not easily pass through the gap (i.e., the slit 202), and a flow of the magnetic flux changes. The fourth end part 24 contributes to reduction of harmonics of an induced voltage, reduction of cogging torque, and reduction of noise of the electric motor 1 during rotation of the rotor 2.

The fifth end part 25 is adjacent to the fourth end part 24 and the first end part 21. In other words, the fifth end part 25 is formed between the fourth end part 24 and the first end part 21. The fifth end part 25 extends in the direction (direction parallel to the magnetic pole center line A2) orthogonal to the longitudinal direction of the permanent magnet 220 at the magnetic pole center side in the slit 202. Accordingly, the magnetic flux from the permanent magnet 220 can be concentrated toward the magnetic pole center. The fifth end part 25 may tilt relative to the magnetic pole center line A2. In this embodiment, the fifth end part 25 is a surface (inner surface) constituting an inner wall of the slit 202. The fifth end part 25 contributes to reduction of harmonics of an induced voltage, reduction of cogging torque, and reduction of noise of the electric motor 1 during rotation of the rotor 2.

In this embodiment, the slit 202 is defined by the first end part 21 through the fifth end part 25 (i.e., the five end parts), but may be defined by six or more end parts.

The first end part 21, the second end part 22, the third end part 23, the fourth end part 24, and the fifth end part 25 may be edges (edges parallel to the xy plane) of inner walls forming the magnet insertion hole 201. In this case, the first end part 21, the second end part 22, the third end part 23, the fourth end part 24, and the fifth end part 25 are located at arbitrary positions in the z-axis direction on the same plane (xy plane).

Figure 4A:
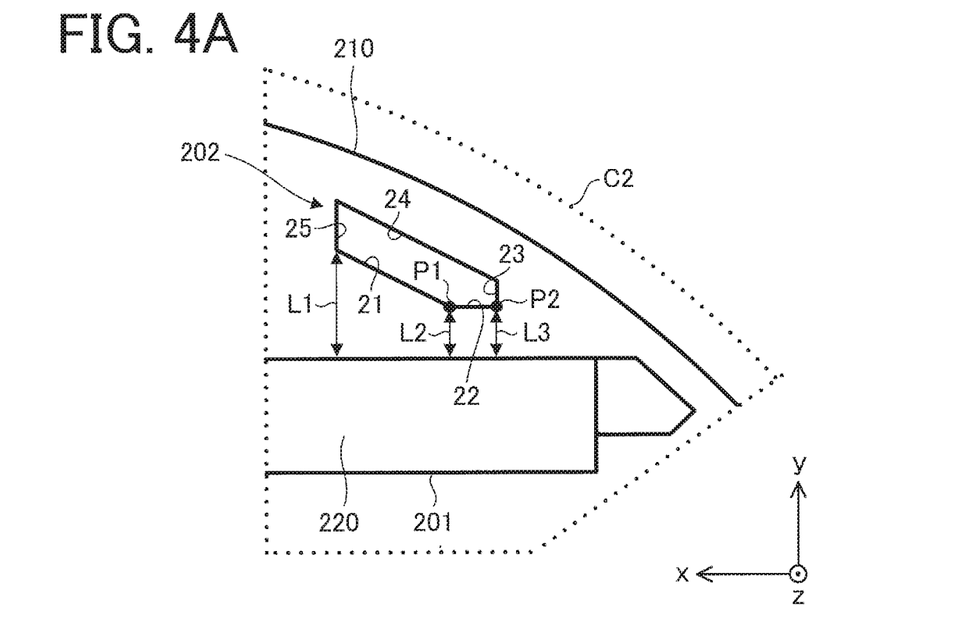
FIGS. 4A and 4B are enlarged views illustrating a region C2 indicated by a dotted line in FIG. 3B.
Figure 4B:
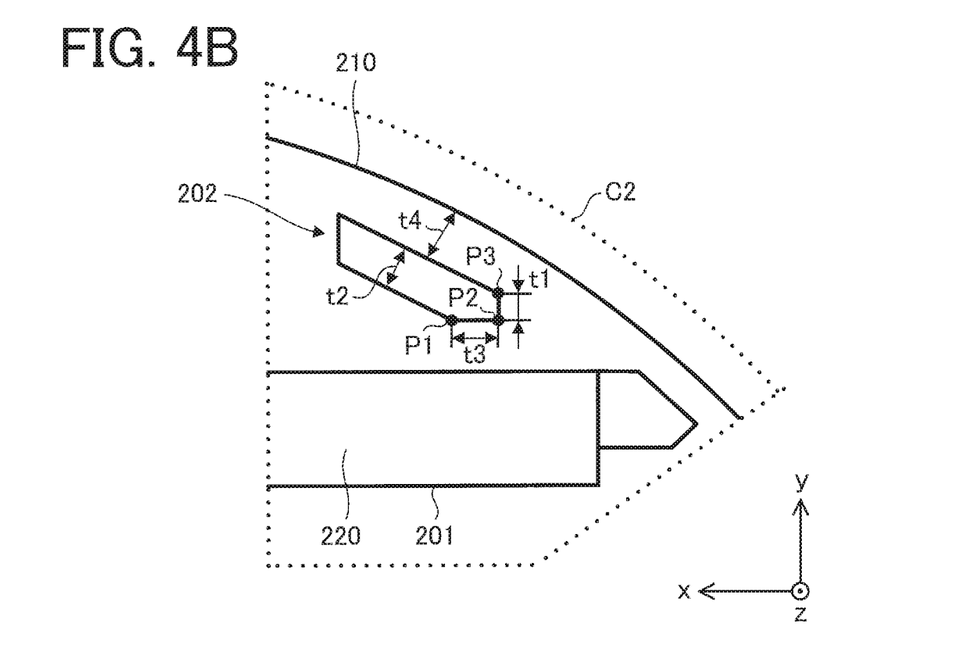

FIGS. 4A and 4B are enlarged views illustrating a region C2 indicated by a dotted line in FIG. 3B.

A distance L1 shown in FIG. 4A is a minimum distance from a position (not including a boundary P1) on the first end part 21 to the magnet insertion hole 201 (permanent magnet 220). A distance L2 is a minimum distance from the boundary P1 between the first end part 21 and the second end part 22 to the magnet insertion hole 201 (permanent magnet 220). A distance L3 is a minimum distance from a boundary P2 between the second end part 22 and the third end part 23 to the magnet insertion hole 201 (permanent magnet 220). In the example illustrated in FIG. 4A, the distance L1 is a minimum distance from the boundary between the first end part 21 and the fifth end part 25 (a position on the first end part 21 closest to the fifth end part 25) to the magnet insertion hole 201 (permanent magnet 220).

The boundary P1 (first boundary) separates the first end part 21 and the second end part 22 from each other, for example. In a case where the boundary P1 is unclear, a portion of the inner wall of the slit 202 at the center between the first end part 21 and the second end part 22 may be assumed to be the boundary P1. For example, in a case where a region (inner wall) between the first end part 21 and the second end part 22 is formed in the shape of a circular arc, a center of the circular arc shaped part on the xy plane may be assumed to be the boundary P1.

The boundary P2 (second boundary) separates the second end part 22 and the third end part 23 from each other, for example. In a case where the boundary P2 is unclear, a portion of the inner wall of the slit 202 at the center between the second end part 22 and the third end part 23 may be assumed to be the boundary P2. For example, in a case where a region (inner wall) between the second end part 22 and the third end part 23 is formed in the shape of a circular arc, a center of the circular arc shaped part on the xy plane may be assumed to be the boundary P2.

The rotor 2 (specifically, the magnetic steel sheet 210) satisfies the following equation (1):

$$L1 > L2, \text{ and } L3 \geq L2 \quad (1)$$

In the example illustrated in FIG. 4A, in the rotor 2 (specifically, the electromagnetic steel sheet 210), the distance L2 is equal to the distance L3. However, a relationship between the distance L2 and L3 may be L3>L2. When the relationship between the distance L2 and L3 satisfies L3>L2, the second end part 22 tilts relative to the longitudinal direction of the permanent magnet 220.

In general, if the distance between a slit and a permanent magnet is small, permeance of the permanent magnet decreases, and demagnetization easily occurs. In this embodiment, since the rotor 2 (specifically, the electromagnetic steel sheet 210) of the electric motor 1 satisfies the expression of L3≥L2, the distance between the slit 202 (e.g., the second end part 22) and the permanent magnet 220 can be made large, and thus a demagnetization characteristic can be ameliorated.

The rotor 2 (specifically, the electromagnetic steel sheet 210) satisfies the expression of L1>L3. Accordingly, the slit 202 can be formed so as to extend in the circumferential direction.

The rotor 2 (specifically, the electromagnetic steel sheet 210) satisfies the expression of t2>t1, where t1 is a minimum distance from the second end part 22 to the fourth end part 24 (e.g., a distance from the boundary P2 to a boundary P3 between the third end part 23 and the fourth end part 24) and t2 is a minimum distance from the first end part 21 to the fourth end part 24. When the rotor 2 (specifically, the electromagnetic steel sheet 210) satisfies the expression of t2>t1, the rotor 2 (specifically, the electromagnetic steel sheet 210) satisfying equation (1) described above can be obtained.

The boundary P3 separates the third end part 23 and the fourth end part 24 from each other, for example. In a case where the boundary P3 is unclear, a portion of the inner wall of the slit 202 at the center between the third end part 23 and the fourth end part 24 may be assumed to be the boundary P3. For example, in a case where a region (inner wall) between the third end part 23 and the fourth end part 24 is formed in the shape of a circular arc, a center of the circular arc shaped part on the xy plane may be assumed to be the boundary P3.

The distance t1 and the thickness t0 of the electromagnetic steel sheet 210 satisfy the expression of t1≥t0. Accordingly, the electromagnetic steel sheet 210 can be easily punched. In addition, when the relationship of t1≥t0 is satisfied, a gap necessary for restricting a flow of the magnetic flux from the permanent magnet 220 (i.e., a width of the slit 202) can be obtained.

A distance t4 shown in FIG. 4B is a minimum distance from a position on the fourth end part 24 to the outer peripheral surface of the rotor core 20 (the electromagnetic steel sheet 210) (i.e., the width of the electromagnetic steel sheet 210). The distance t4 and the thickness t0 of the electromagnetic steel sheet 210 satisfy the expression of t4>t0. Accordingly, the electromagnetic steel sheet 210 can be easily punched. In addition, when the expression of t2>t1 is satisfied, a sufficient width of the electromagnetic steel sheet 210 from the fourth end part 24 to the outer peripheral surface of the rotor core 20 (the electromagnetic steel sheet 210) (i.e., distance t4) can be obtained.

In general, when an electromagnetic steel sheet is formed by press working, a demagnetization characteristic degrades. Specifically, a demagnetization characteristic of an electromagnetic steel sheet formed by press working degrades from an end portion of the electromagnetic steel sheet in accordance with the thickness of the electromagnetic steel sheet. That is, degradation of a demagnetization characteristic in a width in accordance with the thickness of the electromagnetic steel sheet occurs from each of the inner wall of the slit and the outer peripheral surface the electromagnetic steel sheet. Thus, the rotor 2 (specifically, the electromagnetic steel sheet 210) preferably satisfies the expression of t4≥2×t0. In this manner, degradation of a demagnetization characteristic can be reduced, and harmonics of an induced voltage can be reduced.

In general, when magnetic saturation occurs in a region between a slit and a permanent magnet, magnetic permeability decreases, and permeance of the permanent magnet decreases. Accordingly, a demagnetization characteristic degrades. In general, when saturation magnetic flux density B2 of an electromagnetic steel sheet exceeds a range of 1.6 [T] to 1.8 [T], magnetic permeability rapidly decreases.

The amount of the magnetic flux flowing between the slit 202 and the permanent magnet 220 is expressed as B1×t3, where B1 [T: tesla] is residual magnetic flux density of the permanent magnet 220, and t3 is a distance between the boundary P1 and the boundary P2 in the direction orthogonal to the magnetic pole center line A2.

The rotor 2 (specifically, the electromagnetic steel sheet 210) preferably satisfies the expressions of $$B2 \geq B1 \times t3/L2 \text{ and } 1.6 \leq B2 \text{ [T]} \leq 1.8,$$

where B2 [T: tesla] is saturation magnetic flux density of the electromagnetic steel sheet 210. Accordingly, degradation of a demagnetization characteristic can be suppressed.

In addition, the rotor 2 (specifically, the electromagnetic steel sheet 210) preferably satisfies the expressions of $$B2 \geq B1 \times t3/L3 \text{ and } 1.6 \leq B2 \text{ [T]} 1.8.$$

Accordingly, degradation of a demagnetization characteristic can be suppressed.

In particular, when the rotor 2 (specifically, the electromagnetic steel sheet 210) satisfies the expression of 1.6≥B1×t3/L2, degradation of a demagnetization characteristic can be effectively suppressed.

Similarly, when the rotor 2 (specifically, the electromagnetic steel sheet 210) satisfies the expression of $1.6 \geq B1 \times t3/L3$, degradation of a demagnetization characteristic can be effectively suppressed.

In general, in consideration of distortion in punching of an electromagnetic steel sheet, magnetic permeability of the electromagnetic steel sheet decreases in a width equal to the thickness of the electromagnetic steel sheet. Thus, in this embodiment, suppose magnetic permeability decreases in a width corresponding to the thickness t0 of the electromagnetic steel sheet 210, a part (range) in which the magnetic permeability is high in a range indicated by the distance L2 is expressed by L2−2×t0, and a part (range) in which the magnetic permeability is high in a range indicated by the distance L3 is expressed by L3−2×t0.

Thus, the rotor 2 (specifically, the electromagnetic steel sheet 210) preferably satisfies the expressions of $B2 \geq B1 \times t3/(L2-2 \times t0)$ and $1.6 \leq B2$ [T] $\leq 1.8$.

Accordingly, degradation of a demagnetization characteristic can be more effectively suppressed.

Furthermore, the rotor 2 (specifically, the electromagnetic steel sheet 210) preferably satisfies the expressions of $B2 \geq B1 \times t3/(L3-2 \times t0)$ and $1.6 \leq B2$ [T] $\geq 1.8$.

Accordingly, degradation of a demagnetization characteristic can be more effectively suppressed.

Thus, the rotor 2 (specifically, the electromagnetic steel sheet 210) satisfying the expression of $1.6 \geq B1 \times t3/(L2-2 \times t0)$ is an example concerning a most preferable distance L2 in this embodiment.

Similarly, the rotor 2 (specifically, the electromagnetic steel sheet 210) satisfying the expression of $1.6\ B1 \times t3/(L3-2 \times t0)$ is an example concerning a most preferable distance L3 in this embodiment.

First Variation

Figure 5:
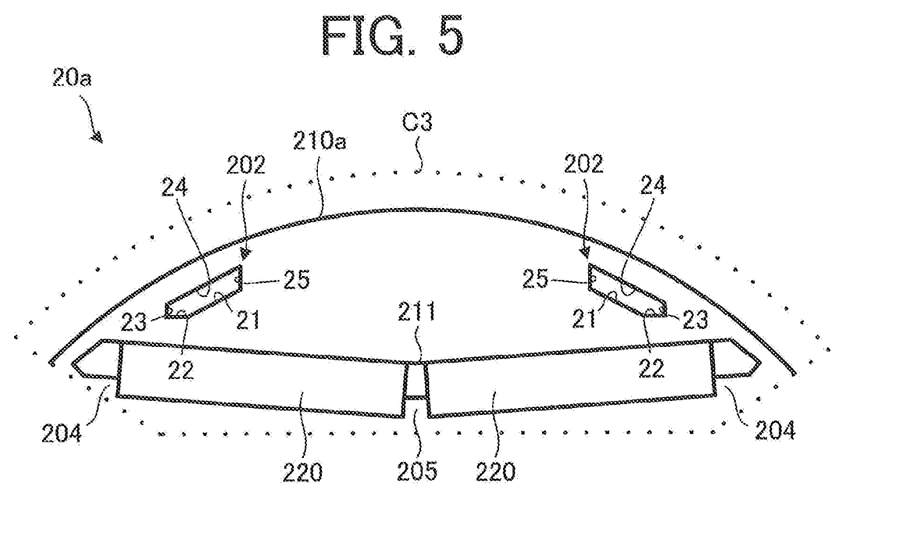
FIG. 5 is a plan view schematically illustrating a structure of a part of a rotor core of an electric motor according to a first variation.

FIG. 5 is a plan view schematically illustrating a structure of a part of a rotor core 20a of an electric motor according to a first variation. A region C3 indicated by a dotted line in FIG. 5 corresponds to the region C1 indicated by the dotted line in FIG. 3A.

The rotor core 20a is different from the rotor core 20 of the rotor 2 in the first embodiment in the structure of an electromagnetic steel sheet 210a (specifically, a magnet insertion hole 211) and in that a plurality of permanent magnets 220 are inserted in one magnet insertion hole 211. The other respects are the same as the rotor core 20. The rotor core 20a is applicable to the rotor 2 of the electric motor 1 according to the first embodiment, instead of the rotor core 20.

The electromagnetic steel sheet 210a includes positioning parts 204 (first positioning parts) positioning the permanent magnets 220 inserted in the magnet insertion hole 211 and a positioning part 205 (second positioning part). The positioning parts 204 and the positioning part 205 are, for example, projections. In the example illustrated in FIG. 5, the electromagnetic steel sheet 210a includes two positioning parts 204 and one positioning part 205 for one magnet insertion hole 211.

In the example illustrated in FIG. 5, two permanent magnets 220 (first and second permanent magnets) are inserted in one magnet insertion hole 211. The two permanent magnets 220 are fixed by the positioning parts 204 formed at both sides of the two permanent magnets 220 and the positioning part 205 formed between the two permanent magnets 220. Accordingly, it is possible to prevent the two permanent magnets 220 from hitting each other.

In general, a magnetic flux from a stator easily pass through a positioning part (projection), and thus, a demagnetization characteristic can degrade in some cases. Accordingly, in a case where two or more permanent magnets are used for one magnetic pole (one magnet insertion hole), by using permanent magnets having larger thickness (e.g., the thickness in the radial direction) or permanent magnets having high magnetic forces, degradation of a demagnetization characteristic can be ameliorated. In this case, however, the cost of the permanent magnets increases.

In view of this, in the first variation, even in the case of using two permanent magnets 220 for one magnetic pole, degradation of a demagnetization characteristic can be ameliorated by satisfying equation (1) described in the first embodiment, and thus, the highly efficient rotor 2 (the rotor core 20a) can be obtained.

Second Variation

Figure 6:
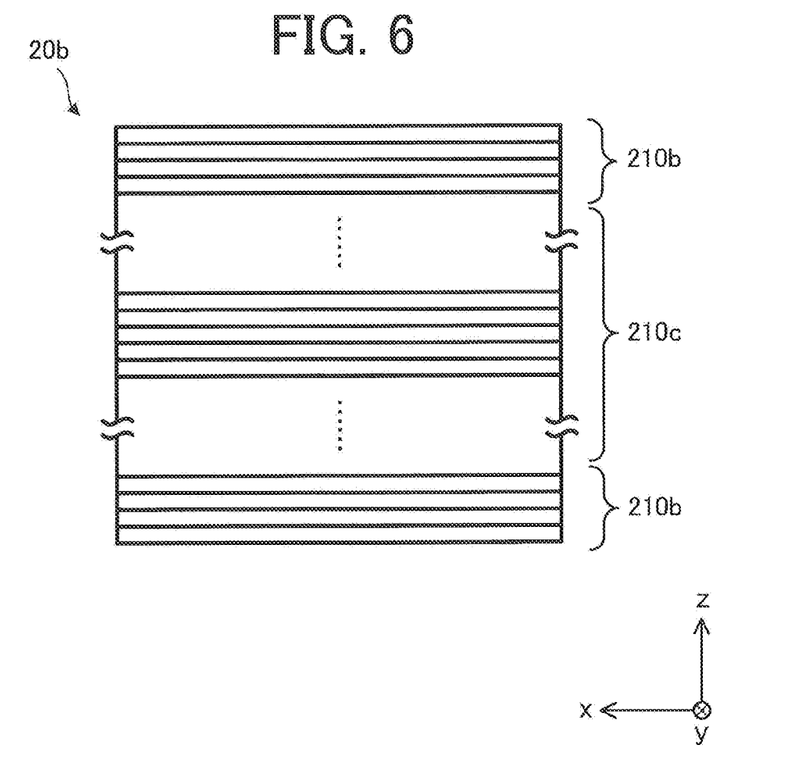
FIG. 6 is a front view schematically illustrating a structure of a rotor core of an electric motor according to a second variation.

FIG. 6 is a front view schematically illustrating a structure of a rotor core 20b of an electric motor according to a second variation.

Figure 7:
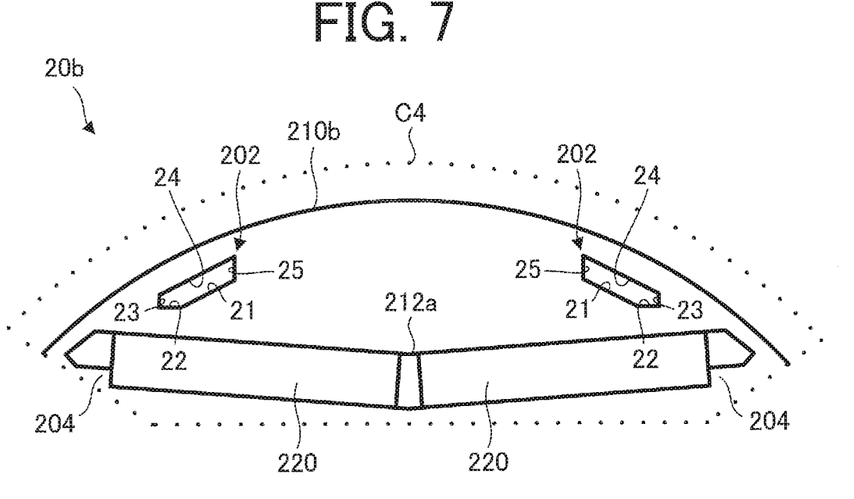
FIG. 7 is a plan view schematically illustrating a structure of a part of one of a plurality of electromagnetic steel sheets of the rotor core.

FIG. 7 is a plan view schematically illustrating a structure of a part of one electromagnetic steel sheet 210b of a plurality of electromagnetic steel sheets of the rotor core 20b. A region C4 indicated by a dotted line in FIG. 7 corresponds to the region C1 indicated by the dotted line in FIG. 3A.

Figure 8:
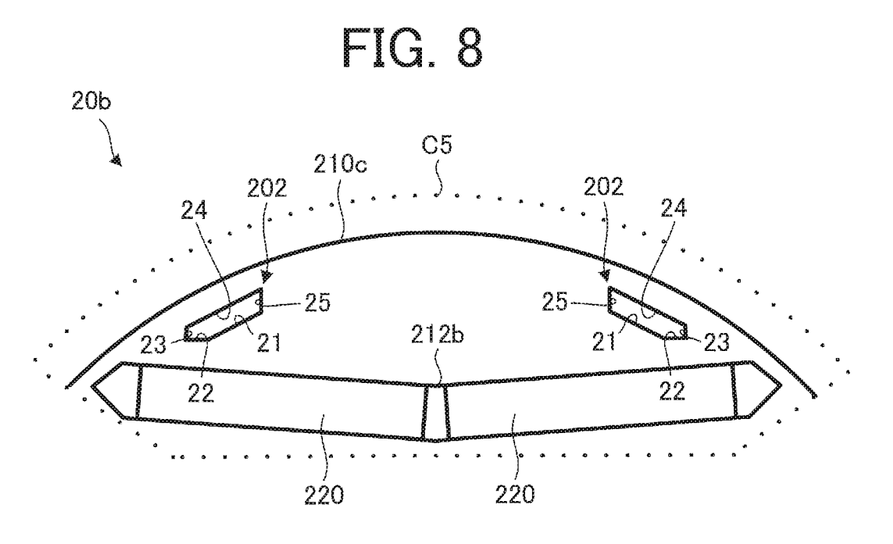
FIG. 8 is a plan view schematically illustrating a structure of a part of one of a plurality of electromagnetic steel sheets of the rotor core.

FIG. 8 is a plan view schematically illustrating a structure of a part of one electromagnetic steel sheet 210c of the plurality of electromagnetic steel sheets of the rotor core 20b. A region C5 indicated by a dotted line in FIG. 8 corresponds to the region C1 indicated by the dotted line in FIG. 3A.

The rotor core 20b is different from the rotor core 20 of the rotor 2 in the first embodiment in the structure of the electromagnetic steel sheet 210b (specifically, magnet insertion hole 212a) and electromagnetic steel sheet 210c (specifically, magnet insertion hole 212b) and in that a plurality of permanent magnets 220 are inserted in one magnet insertion hole 212. The other respects are the same as the rotor core 20. The rotor core 20b is applicable to the rotor 2 of the electric motor 1 according to the first embodiment, instead of the rotor core 20.

The electromagnetic steel sheet 210b illustrated in FIG. 7 is different from the electromagnetic steel sheet 210a in the first variation in including no positioning part 205, and is the same as the first variation in the other respects. The electromagnetic steel sheet 210c illustrated in FIG. 8 is different from the electromagnetic steel sheet 210a in the first variation in not including the positioning part 204 and 205, and is the same as the first variation in the other respects.

As illustrated in FIG. 6, the rotor core 20b is formed by stacking the electromagnetic steel sheets 210b and the electromagnetic steel sheets 210c different from the electromagnetic steel sheets 210b. The electromagnetic steel sheets 210b and 210c are not limited to a specific combination (the number of stacked sheets and an order of stacking). In the example illustrated in FIG. 6, the plurality of electromagnetic steel sheets 210b constitute an upper layer and a lower layer of the rotor core 20b, and the plurality of electromagnetic steel sheets 210c constitute an intermediate layer of the rotor core 20b. The number of permanent magnets 220 inserted in one magnet insertion hole 212 may be one.

Advantages of the electric motor 1 and the rotor 2 according to the first embodiment (including the variations thereof) will be described below.

Figure 9:
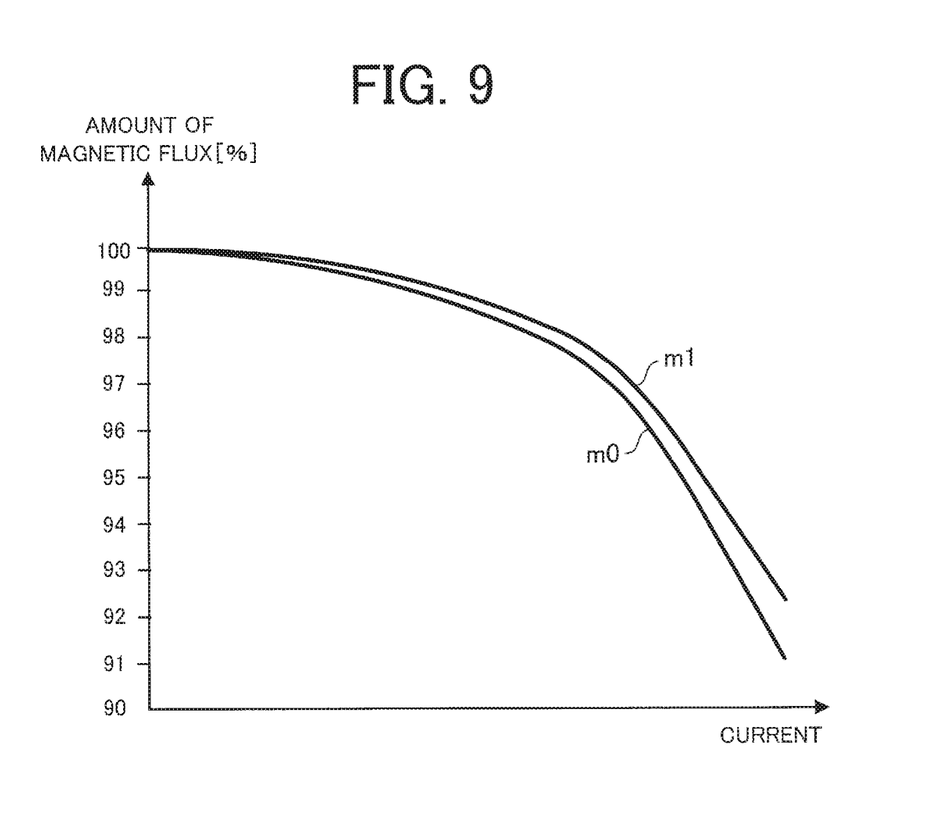
FIG. 9 is a diagram showing relationships between a current flowing in a coil of a stator and a proportion [%] of a magnetic flux amount from a permanent magnet.

FIG. 9 is a diagram showing relationships between a current flowing in a coil of a stator and a proportion [%] of a magnetic flux amount from a permanent magnet. In FIG. 9, m0 represents a relationship between a proportion of a magnetic flux amount and a current in a conventional electric motor, and m1 represents a relationship between a proportion of a magnetic flux amount and a current in the electric motor 1 according to the first embodiment as compared to the conventional electric motor. Slits formed in electromagnetic steel sheets of the conventional electric motor (m0 in FIG. 9) are formed to satisfy L1>L2 and L2>L3. The slits 202 formed in the electromagnetic steel sheets 210 of the electric motor 1 according to the first embodiment (m1 in FIG. 9) are formed to satisfy the expressions of L1>L2 and L3≥L2.

As illustrated in FIG. 9, in each of the electric motors, as a current increases, demagnetization of permanent magnets occurs and the amount of magnetic flux decreases. However, a large amount of magnetic flux from the permanent magnets 220 is kept in the electric motor 1 according to the first embodiment (m1 in FIG. 9) and a demagnetization characteristic of the permanent magnets 220 is ameliorated, as compared to the conventional electric motor (m0 in FIG. 9). That is, the rotor 2 of the electric motor 1 according to the first embodiment (including the variations thereof) satisfies equation (1) described above, and thus, a demagnetization characteristic of the permanent magnets 220 can be ameliorated as compared to the rotor including conventional electromagnetic steel sheets.

That is, since the rotor 2 of the electric motor 1 according to the first embodiment (including the variations thereof) satisfies equation (1) described above, the distance between the permanent magnet 220 and the first and second end parts 21 and 22 that are end parts on the permanent magnet 220 side of the plurality of end parts defining the slit 202 can be increased. Therefore, the distance between the slit 202 and the permanent magnet 220 increases, and thus permeance of the permanent magnets 220 can be improved. As a result, demagnetization can be ameliorated.

Figure 10A:
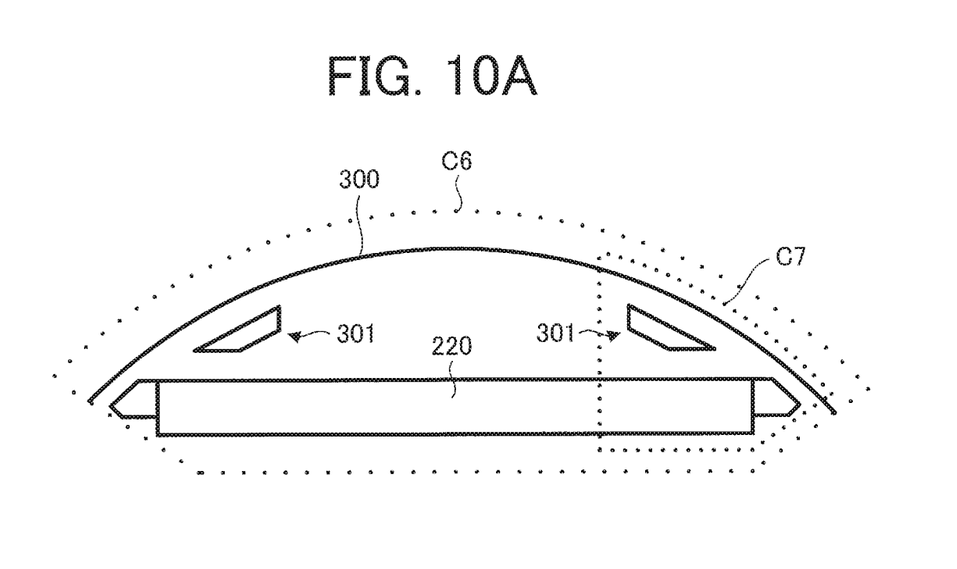
FIG. 10A is a plan view schematically illustrating a structure of a part of an electromagnetic steel sheet of an electric motor as a comparative example.
Figure 10B:
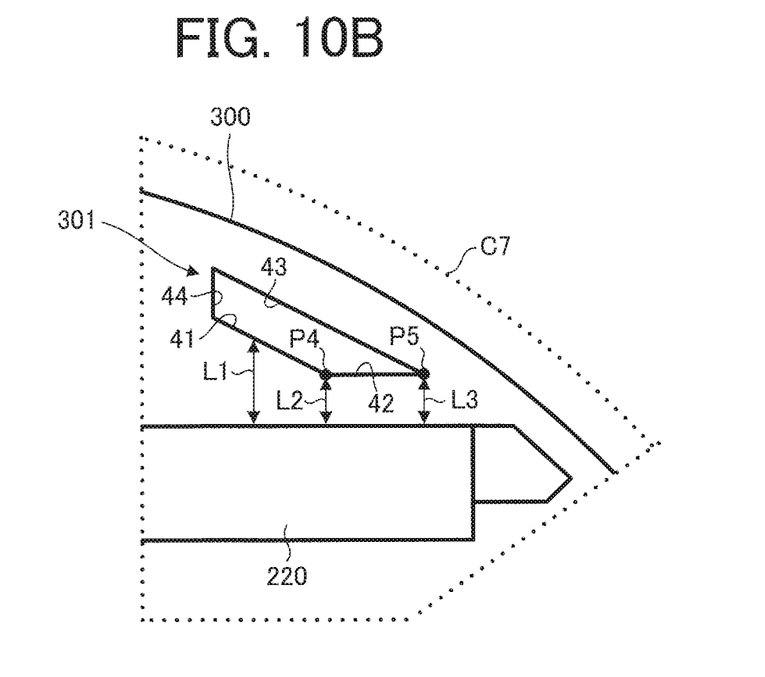
FIG. 10B is an enlarged view illustrating a region C7 indicated by a dotted line in FIG. 10A.

FIG. 10A is a plan view schematically illustrating a structure of a part of an electromagnetic steel sheet 300 of an electric motor as a comparative example. FIG. 10B is an enlarged view illustrating a region C7 indicated by a dotted line in FIG. 10A. A region C6 indicated by a dotted line in FIG. 10A corresponds to the region C1 indicated by the dotted line in FIG. 3A.

A boundary P4 illustrated in FIG. 10B corresponds to the boundary P1 illustrated in FIG. 4A, and a boundary P5 corresponds to the boundary P2 illustrated in FIG. 4A. An end part 41 illustrated in FIG. 10B corresponds to the first end part 21 illustrated in FIG. 4A, and an end part 42 corresponds to the second end part 22 illustrated in FIG. 4A.

As illustrated in FIG. 10B, in a case where the position and the shape of a slit 301 extending in the circumferential direction are defined by four end parts 41, 42, 43, and 44 so as to satisfy the expressions of L1>L2 and L3≥L2, an inner corner of the slit 301 (e.g., a corner formed by the end part 42 and 43) is formed at an acute angle. In this case, the width of the slit 301 decreases, and thus, it is difficult to restrict the direction of magnetic flux from the permanent magnet 220. In addition, in the case where the inner corner of the slit is at an acute angle, a die for punching of an electromagnetic steel sheet is easily damaged.

In this embodiment, the position and shape of the slit 202 extending in the circumferential direction are defined by at least five end parts (e.g., the first end part 21 through the fifth end part 25) so as to satisfy the expressions of L1>L2 and L3≥L2, and thus, a demagnetization characteristic can be ameliorated, and it is possible to obtain the electromagnetic steel sheet 210 capable of avoiding damage to a die.

When the rotor 2 (specifically, the electromagnetic steel sheet 210) satisfies the expression of L1>L3, the slit 202 can be formed so as to extend in the circumferential direction, and thus noise during rotation of the rotor 2 can be reduced.

When the rotor 2 (specifically, the electromagnetic steel sheet 210) satisfies the expression of t2>t1, a sufficient width of the electromagnetic steel sheet 210 from the fourth end part 24 to the outer peripheral surface of the rotor core 20 (the electromagnetic steel sheet 210) (i.e., distance t4) can be obtained, and punching of the electromagnetic steel sheet 210 can be performed easily.

When the rotor 2 (specifically, the electromagnetic steel sheet 210) satisfies the expression of t1≥t0, punching of the electromagnetic steel sheet 210 can be performed easily. In addition, since the relationship of t1≥t0 is satisfied, a gap necessary for restricting a flow of the magnetic flux from the permanent magnet 220 (i.e., a width of the slit 202) can be obtained.

When the rotor 2 (specifically, the electromagnetic steel sheet 210) satisfies the expressions of $$B2 \geq B1 \times t3/L2 \text{ and } 1.6 \leq B2 \text{ [T]} \geq 1.8,$$

degradation of a demagnetization characteristic can be suppressed.

In addition, when the rotor 2 (specifically, the electromagnetic steel sheet 210) satisfies the expressions of $$B2 \geq B1 \times t3/(L2-2 \times t0) \text{ and } 1.6 \leq B2 \text{ [T]} \leq 1.8,$$

degradation of a demagnetization characteristic can be effectively suppressed.

In general, in a case where the center of teeth of a stator coincides with a magnetic pole center line of a rotor during rotation of the rotor and a slot opening (a region between the teeth) of the stator is located in the radial direction side of the slit, harmonics of an induced voltage increase. For example, in a case where a slit extending in a circumferential direction is formed outside a permanent magnet in a radial direction, harmonics of an induced voltage easily increase. In particular, if the distance from the slit to the outer peripheral surface of the rotor is small, magnetic permeability of an electromagnetic steel sheet decreases, and magnetic flux passing over the rotor surface are disturbed, so that harmonics of an induced voltage increases. In view of this, in this embodiment, the rotor 2 (specifically, the electromagnetic steel sheet 210) satisfies the expression of t4≥2×t0. Accordingly, the distance from the slit 202 to the outer peripheral surface of the rotor 2 can be increased, and thus harmonics of an induced voltage can be reduced.

According to the first variation, even in a case where two permanent magnets 220 are used for one magnetic pole, satisfying equation (1) described in the first embodiment makes it possible to ameliorate degradation of a demagnetization characteristic and to obtain the highly efficient rotor 2 (the rotor core 20a).

According to the second variation, the combination of the electromagnetic steel sheets 210b with the positioning parts 204 and the electromagnetic steel sheets 210c without the positioning parts 204 makes it possible to ameliorate degradation of a demagnetization characteristic and to reduce cost of the rotor core 20b. In addition, satisfying equation (1) described in the first embodiment makes it possible to ameliorate degradation of a demagnetization characteristic and to obtain the highly efficient rotor 2 (the rotor core 20b).

As described above, since the electric motor 1 includes the rotor 2, reduction of harmonics of an induced voltage and torque ripple are reduced, and degradation of a demagnetization characteristic can be suppressed. In addition, manufacturing cost of the rotor 2 and the electric motor 1 can be reduced.

Second Embodiment

An air conditioner 10 according to a second embodiment of the present invention will be described.

Figure 11:
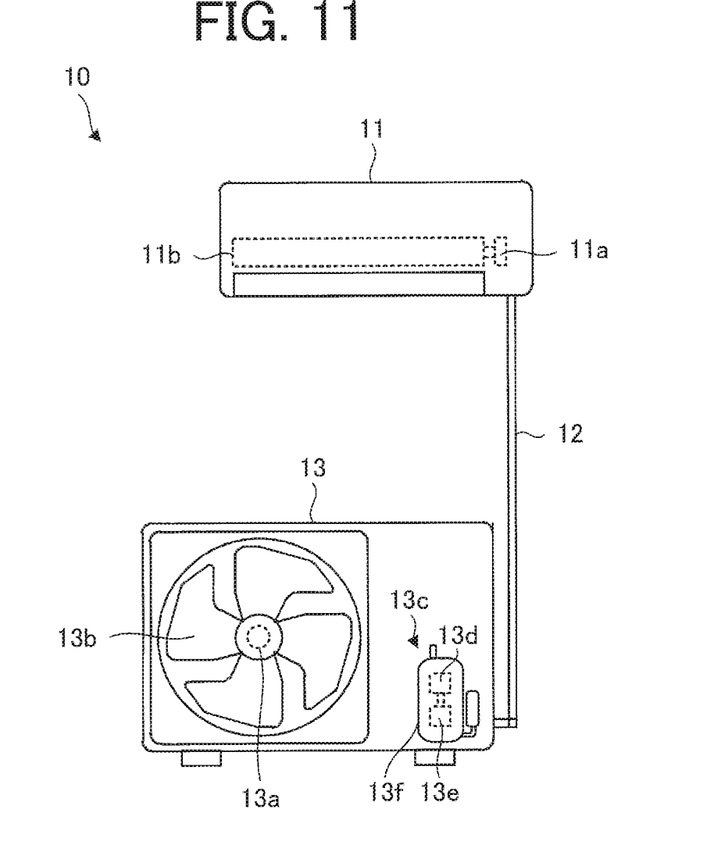
FIG. 11 is a diagram schematically illustrating a configuration of an air conditioner according to a second embodiment of the present invention.

FIG. 11 is a diagram schematically illustrating a configuration of the air conditioner 10 according to the second embodiment of the present invention.

The air conditioner 10 (e.g., a refrigerating air conditioner) according to the second embodiment includes an indoor unit 11 as an air blower (first air blower), a refrigerant pipe 12, an outdoor unit 13 as an air blower (second air blower) connected to the indoor unit 11 through the refrigerant pipe 12.

The indoor unit 11 includes an electric motor 11a (e.g., the electric motor 1 according to the first embodiment) and an air blowing unit 11b that blows air when being driven by the electric motor 11a. The air blowing unit 11b includes blades that are driven by the electric motor 11a, for example.

The outdoor unit 13 includes an electric motor 13a (e.g., the electric motor 1 according to the first embodiment), an air blowing unit 13b, a compressor 13c, and a heat exchanger (not shown). The air blowing unit 13b blows air when being driven by the electric motor 13a. The air blowing unit 13b includes blades that are driven by the electric motor 13a, for example. The compressor 13c includes an electric motor 13d (e.g., the electric motor 1 according to the first embodiment), a compression mechanism 13e (e.g., a refrigerant circuit) that is driven by the electric motor 13d, and a housing 13f covering the electric motor 13d and the compression mechanism 13e.

In the air conditioner 10 according to the second embodiment, at least one of the indoor unit 11 and the outdoor unit 13 includes the electric motor 1 described in the first embodiment (including the variations thereof). Specifically, as a driving source of the air blowing unit, the electric motor 1 described in the first embodiment (including the variations thereof) is applied to at least one of the electric motors 11a and 13a. As the electric motor 13d of the compressor 13c, the electric motor 1 described in the first embodiment (including the variations thereof) may be used.

The air conditioner 10 can perform operations such as a cooling operation of sending cold air and a heating operation of sending warm air from the indoor unit 11. In the indoor unit 11, the electric motor 11a is a driving source for driving the air blowing unit 11b. The air blowing unit 11b can send conditioned air.

The electric motor 1 described in the first embodiment (including the variations thereof) can be mounted on equipment including a driving source, such as a ventilator, a home appliance, or a machine tool, as well as the air conditioner 10.

In the air conditioner 10 according to the second embodiment, the electric motor 1 described in the first embodiment (including the variations thereof) is applied to at least one of the electric motors 11a and 13a, and thus, advantages similar to those described in the first embodiment can be obtained.

In addition, according to the second embodiment, by using the electric motor 1 described in the first embodiment (including the variations thereof), the air blowers (the indoor unit 11 and the outdoor unit 13), the compressor 13c, and the air conditioner 10 efficient in operation can be obtained.

In general, an electric motor in a compressor is used at temperatures of 100° C. or more, and thus, it is necessary to prevent degradation of a demagnetization characteristic. In view of this, by using the electric motor 1 described in the first embodiment as the electric motor 13d, cost of the compressor 13c can be reduced, and degradation of a demagnetization characteristic can be suppressed.

In general, when a foreign substance enters an air blower or the air blower is exposed to a headwind, an abrupt change of torque of an electric motor or a locked state of the electric motor occurs. This causes an abrupt increase in a current to the electric motor, and thus it is necessary to prevent degradation of a demagnetization characteristic. Accordingly, by using the electric motor 1 described in the first embodiment as an electric motor (e.g., the electric motor 11a or 13a) of an air blower (e.g., the air blowing unit 11b or 13b), cost of the air blower can be reduced, and degradation of a demagnetization characteristic can be suppressed.

Features of the embodiments and features of the variations described above can be combined as appropriate.

What is claimed is:

1. A rotor comprising:
an electromagnetic steel sheet including a magnet insertion hole and a slit formed outside the magnet insertion hole in a radial direction; and
a first permanent magnet inserted in the magnet insertion hole, wherein
the electromagnetic steel sheet includes a first end part extending in a circumferential direction, a second end part adjacent to the first end part, a third end part adjacent to the second end part, a fourth end part adjacent to the third end part, and a fifth end part adjacent to the fourth end part, the first, second, third, fourth, and fifth end parts defining the slit, and
the rotor satisfies expressions of
$L1>L2$, $L1>L3$, and $L3 \geq L2$, where $L1$ is a distance from the first end part to the magnet insertion hole, $L2$ is a distance from a first boundary between the first end part and the second end part to the magnet insertion hole, and $L3$ is a distance from a second boundary between the second end part and the third end part to the magnet insertion hole.

2. The rotor according to claim 1, wherein
the first end part is adjacent to the fifth end part, and
the distance $L1$ is a distance from a position on the first end part closest to the fifth end part to the magnet insertion hole.

3. The rotor according to claim 1, wherein the fourth end part extends in the circumferential direction.

4. The rotor according to claim 1, wherein the rotor satisfies an expression of
$t2>t1$, where $t1$ is a minimum distance from the second end part to the fourth end part, and $t2$ is a minimum distance from the first end part to the fourth end part.

5. The rotor according to claim 1, wherein the rotor satisfies an expression of
$t1 \geq t0$, where $t0$ is a thickness of the electromagnetic steel sheet.

6. The rotor according to claim 1, wherein the rotor satisfies an expression of
$B2 \geq B1 \times t3/(L2-2 \times t0)$, where $t0$ is a thickness of the electromagnetic steel sheet, $t3$ is a distance from the first boundary to the second boundary, $B1$ is residual magnetic flux density of the first permanent magnet, and $B2$ is saturation magnetic flux density of the electromagnetic steel sheet.

7. The rotor according to claim 6, wherein the saturation magnetic flux density of the electromagnetic steel sheet is 1.6 T or more and 1.8 T or less.

8. The rotor according to claim 1, wherein the rotor satisfies an expression of
$B2 \geq B1 \times t3/L2$, where B1 is residual magnetic flux density of the first permanent magnet, B2 is saturation magnetic flux density of the electromagnetic steel sheet, and t3 is a distance from the first boundary to the second boundary.

9. The rotor according to claim 1, further comprising a second permanent magnet inserted in the magnet insertion hole.

10. The rotor according to claim 1, wherein the electromagnetic steel sheet includes a positioning part positioning the first permanent magnet.

11. The rotor according to claim 1, wherein the first permanent magnet is a rare earth magnet containing at least one of neodymium, boron, and dysprosium as a main component, and has a dysprosium content of 4% by weight or less.

12. An electric motor comprising:
a stator; and
a rotor, wherein
the rotor includes:
an electromagnetic steel sheet including a magnet insertion hole and a slit formed outside the magnet insertion hole in a radial direction; and
a first permanent magnet inserted in the magnet insertion hole,
the electromagnetic steel sheet includes a first end part extending in a circumferential direction, a second end part adjacent to the first end part, a third end part adjacent to the second end part, a fourth end part adjacent to the third end part, and a fifth end part adjacent to the fourth end part, the first, second, third, fourth, and fifth end parts defining the slit, and
the rotor satisfies expressions of
$L1>L2$, $L1>L3$, and $L3 \geq L2$, where L1 is a distance from the first end part to the magnet insertion hole, L2 is a distance from a first boundary between the first end part and the second end part to the magnet insertion hole, and L3 is a distance from a second boundary between the second end part and the third end part to the magnet insertion hole.

13. A compressor comprising:
an electric motor;
a compression mechanism that is driven by the electric motor; and
a housing covering the electric motor and the compression mechanism, wherein
the electric motor includes:
a stator; and
a rotor,
the rotor includes:
an electromagnetic steel sheet including a magnet insertion hole and a slit formed outside the magnet insertion hole in a radial direction; and
a first permanent magnet inserted in the magnet insertion hole,
the electromagnetic steel sheet includes a first end part extending in a circumferential direction, a second end part adjacent to the first end part, a third end part adjacent to the second end part, a fourth end part adjacent to the third end part, and a fifth end part adjacent to the fourth end part, the first, second, third, fourth, and fifth end parts defining the slit, and
the rotor satisfies expressions of
$L1>L2$, $L1>L3$, and $L3 \geq L2$, where L1 is a distance from the first end part to the magnet insertion hole, L2 is a distance from a first boundary between the first end part and the second end part to the magnet insertion hole, and L3 is a distance from a second boundary between the second end part and the third end part to the magnet insertion hole.

14. An air blower comprising:
an electric motor;
an air blowing unit that is driven by the electric motor, wherein
the electric motor includes:
a stator; and
a rotor,
the rotor includes:
an electromagnetic steel sheet including a magnet insertion hole and a slit formed outside the magnet insertion hole in a radial direction; and
a first permanent magnet inserted in the magnet insertion hole,
the electromagnetic steel sheet includes a first end part extending in a circumferential direction, a second end part adjacent to the first end part, a third end part adjacent to the second end part, a fourth end part adjacent to the third end part, and a fifth end part adjacent to the fourth end part, the first, second, third, fourth, and fifth end parts defining the slit, and
the rotor satisfies expressions of
$L1>L2$, $L1>L3$, and $L3 \geq L2$, where L1 is a distance from the first end part to the magnet insertion hole, L2 is a distance from a first boundary between the first end part and the second end part to the magnet insertion hole, and L3 is a distance from a second boundary between the second end part and the third end part to the magnet insertion hole.

15. An air conditioner comprising:
an indoor unit; and
an outdoor unit connected to the indoor unit, at least one of the indoor unit and the outdoor unit including an electric motor, wherein
the electric motor includes:
a stator; and
a rotor,
the rotor includes:
an electromagnetic steel sheet including a magnet insertion hole and a slit formed outside the magnet insertion hole in a radial direction; and
a first permanent magnet inserted in the magnet insertion hole,
the electromagnetic steel sheet includes a first end part extending in a circumferential direction, a second end part adjacent to the first end part, a third end part adjacent to the second end part, a fourth end part adjacent to the third end part, and a fifth end part adjacent to the fourth end part, the first, second, third, fourth, and fifth end parts defining the slit, and the rotor satisfies expressions of
$L1>L2$, $L1>L3$, and $L3 \geq L2$, where L1 is a distance from the first end part to the magnet insertion hole, L2 is a distance from a first boundary between the first end part and the second end part to the magnet insertion hole, and L3 is a distance from a second boundary between the second end part and the third end part to the magnet insertion hole.

* * * * *